United States Patent
Kim et al.

(10) Patent No.: US 10,743,311 B2
(45) Date of Patent: Aug. 11, 2020

(54) METHOD FOR TRANSMITTING AND RECEIVING SIGNALS IN WIRELESS LAN SYSTEM AND APPARATUS THEREFOR

(71) Applicant: LG ELECTRONICS INC., Seoul (KR)

(72) Inventors: Jinmin Kim, Seoul (KR); Hangyu Cho, Seoul (KR); Saehee Bang, Seoul (KR); Kyungtae Jo, Seoul (KR); Sungjin Park, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 16/093,601

(22) PCT Filed: Apr. 14, 2017

(86) PCT No.: PCT/KR2017/004056
§ 371 (c)(1),
(2) Date: Oct. 12, 2018

(87) PCT Pub. No.: WO2017/179939
PCT Pub. Date: Oct. 19, 2017

(65) Prior Publication Data
US 2019/0124652 A1    Apr. 25, 2019

Related U.S. Application Data

(60) Provisional application No. 62/322,811, filed on Apr. 15, 2016.

(51) Int. Cl.
*H04W 72/04* (2009.01)
*H04W 84/12* (2009.01)
(Continued)

(52) U.S. Cl.
CPC ...... *H04W 72/0446* (2013.01); *H04B 7/0695* (2013.01); *H04L 5/001* (2013.01);
(Continued)

(58) Field of Classification Search
CPC . H04W 72/0446; H04W 88/10; H04W 88/02; H04W 74/002; H04W 84/12;
(Continued)

(56) References Cited

U.S. PATENT DOCUMENTS 9,838,107 B2 * 12/2017 Jo ............... H04B 7/0684
10,187,497 B1 * 1/2019 Sun ............. H04L 69/22
(Continued)

FOREIGN PATENT DOCUMENTS

KR    1020040102955    12/2004
KR    1020100067893    6/2010
(Continued)

OTHER PUBLICATIONS

PCT International Application No. PCT/KR2017/004056, Written Opinion of the International Searching Authority dated Jul. 24, 2017, 21 pages.

*Primary Examiner* — Sharad Rampuria
(74) *Attorney, Agent, or Firm* — Lee, Hong, Degerman, Kang & Waimey PC

(57) ABSTRACT

The present specification relates to a method for transmitting and receiving signals by a station in a wireless LAN (WLAN) system. More specifically, the present specification proposes a method for providing information on a primary channel and information on a channel for transmitting signals when a station transmits signals by bonding or combining a plurality of channels, and suggests a method for transmitting and receiving signals on the basis of such method for providing information, and an apparatus therefor.

10 Claims, 10 Drawing Sheets

(51) Int. Cl.
  *H04B 7/06*     (2006.01)
  *H04L 5/00*     (2006.01)
  *H04L 27/26*    (2006.01)
  *H04W 74/00*    (2009.01)
  *H04W 88/02*    (2009.01)
  *H04W 88/10*    (2009.01)

(52) U.S. Cl.
  CPC .......... *H04L 5/0005* (2013.01); *H04L 5/0048* (2013.01); *H04L 5/0092* (2013.01); *H04L 27/2601* (2013.01); *H04W 74/002* (2013.01); *H04W 84/12* (2013.01); *H04W 88/02* (2013.01); *H04W 88/10* (2013.01); *H04L 5/0023* (2013.01)

(58) Field of Classification Search
  CPC ..... H04L 5/001; H04L 5/0048; H04L 5/0092; H04L 27/2601; H04L 5/0005; H04L 5/0023; H04B 7/0695; H04B 7/00
  See application file for complete search history.

(56) References Cited

U.S. PATENT DOCUMENTS

| | | | |
|---|---|---|---|
| 10,425,982 B2 * | 9/2019 | Yang | H04W 74/02 |
| 2017/0187439 A1 * | 6/2017 | Park | H04B 7/0617 |

FOREIGN PATENT DOCUMENTS

| | | |
|---|---|---|
| KR | 1020140118970 | 10/2014 |
| KR | 1020150141192 | 12/2015 |
| WO | 2006022477 | 3/2006 |

* cited by examiner

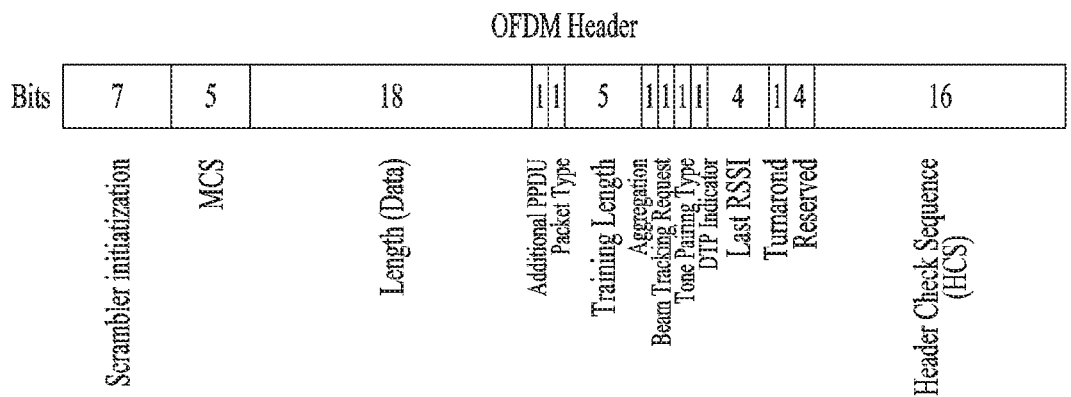

METHOD FOR TRANSMITTING AND RECEIVING SIGNALS IN WIRELESS LAN SYSTEM AND APPARATUS THEREFOR

CROSS-REFERENCE TO RELATED APPLICATIONS

This application is the National Stage filing under 35 U.S.C. 371 of International Application No. PCT/KR2017/004056, filed on Apr. 14, 2017, which claims the benefit of U.S. Provisional Application No. 62/322,811, filed on Apr. 15, 2016, the contents of which are all hereby incorporated by reference herein in their entirety.

TECHNICAL FIELD

Following description relates to an operation method of a station in a wireless LAN (WLAN) system. More particularly, when a station transmits a signal by bonding or combining a plurality of channels in a wireless LAN system, following description relates to a method of providing information on a channel transmitting a signal and information on a primary channel among a plurality of the channels, a method for a station to transmit and receive a signal based on the method of providing the information, and an apparatus therefor.

BACKGROUND ART

Standards for the WLAN technology have been developed as Institute of Electrical and Electronics Engineers (IEEE) 802.11 standards. IEEE 802.11a and b use an unlicensed band at 2.4 GHz or 5 GHz. IEEE 802.11b provides a transmission rate of 11 Mbps and IEEE 802.11a provides a transmission rate of 54 Mbps. IEEE 802.11g provides a transmission rate of 54 Mbps by applying Orthogonal Frequency Division Multiplexing (OFDM) at 2.4 GHz. IEEE 802.11n provides a transmission rate of 300 Mbps for four spatial streams by applying Multiple Input Multiple Output (MIMO)-OFDM. IEEE 802.11n supports a channel bandwidth of up to 40 MHz and, in this case, provides a transmission rate of 600 Mbps.

The above-described WLAN standards have evolved into IEEE 802.11ac that uses a bandwidth of up to 160 MHz and supports a transmission rate of up to 1 Gbits/s for 8 spatial streams and IEEE 802.11ax standards are under discussion. Meanwhile, IEEE 802.11ad defines performance enhancement for high-speed throughput in the 60 GHz band, and IEEE 802.11ay, for introducing channel bonding and MIMO technology to IEEE 802.11ad systems for the first time, is being discussed.

DISCLOSURE OF THE INVENTION

Technical Task

In 11ay system to which the present invention is applicable, it is able to transmit a signal using one or more channels by bonding or combining channels.

In particular, an object of the present invention is to provide a method for an 11ay UE (e.g., a PCP/AP or a station) transmitting a signal to provide channel configuration information on the number of channels used for transmitting a signal among available channels to a reception 11ay UE and a method of transmitting and receiving a signal based on the method of providing the channel configuration information.

Technical Solution

To achieve these and other advantages and in accordance with the purpose of the present invention, as embodied and broadly described, according to one embodiment, a method of transmitting a signal, which is transmitted by a first station (STA) to a second STA in a wireless local area network (WLAN) system, includes transmitting a beacon frame via a primary channel or transmitting information indicating the primary channel to the second STA, transmitting information indicating a plurality of channels including the primary channel on which a signal is transmitted to the second STA, and transmitting the signal to the second STA via the plurality of the channels.

To further achieve these and other advantages and in accordance with the purpose of the present invention, according to a different embodiment, a first station (STA) transmitting a signal in a wireless local area network (WLAN) system includes a transceiver configured to transceive a signal with a second STA with one or more Radio Frequency (RF) chains, and a processor configured to process the signal transceived with the second STA in a manner of being connected with the transceiver, the processor configured to transmit a beacon frame via a primary channel or transmit information indicating the primary channel to the second STA, the processor configured to transmit information indicating a plurality of channels including the primary channel on which a signal is transmitted to the second STA, the processor configured to transmit the signal to the second STA via the plurality of the channels.

To further achieve these and other advantages and in accordance with the purpose of the present invention, according to a further different embodiment, a method of receiving a signal, which is received by a first station (STA) from a second STA in a wireless local area network (WLAN) system, includes obtaining information on a primary channel by receiving a beacon frame via the primary channel or receiving information indicating the primary channel from the second STA, receiving information indicating a plurality of channels including the primary channel on which a signal is transmitted from the second STA, and receiving the signal from the second STA via the plurality of the channels.

To further achieve these and other advantages and in accordance with the purpose of the present invention, according to a further different embodiment, a first station (STA) receiving a signal in a wireless local area network (WLAN) system includes a transceiver configured to transceive a signal with a second STA with one or more Radio Frequency (RF) chains, and a processor configured to process the signal transceived with the second STA in a manner of being connected with the transceiver, the processor configured to obtain information on a primary channel by receiving a beacon frame via the primary channel or receiving information indicating the primary channel from the second STA, the processor configured to receive information indicating a plurality of channels including the primary channel on which a signal is transmitted from the second STA, the processor configured to receive the signal from the second STA via the plurality of the channels.

In this case, the plurality of the channels may include two to four channels.

In this case, the plurality of the channels may correspond to channels adjacent to each other.

In particular, if the plurality of the channels correspond to two channels, the two channels can include two channels adjacent to each other or two channels not adjacent to each other.

In this case, if the first STA transmits the information indicating the primary channel, the information indicating the primary channel and the information indicating the plurality of the channels on which the signal is transmitted can be transmitted via an enhanced directional multi-gigabit (EDMG) Header-A field.

If the first STA transmits the information indicating the primary channel, the information indicating the primary channel and the information indicating the plurality of the channels on which the signal is transmitted can be transmitted via an enhanced directional multi-gigabit (EDMG) operation element.

If the information indicating the primary channel is transmitted, the information indicating the primary channel and the information indicating the plurality of the channels on which the signal is transmitted can be indicated by a single indication field at the same time.

If the first STA transmits a beacon frame via the primary channel, the beacon frame can be transmitted during a Beacon Transmission Interval (BTI).

In this case, preferably, the beacon frame may not be transmitted on a channel rather than the primary channel.

Advantageous Effects

According to the configuration above, stations according to the present invention can transmit and receive a signal with each other by bonding or combining one or more channels without any error.

The effects that may be obtained by the present invention are not limited to the above-mentioned effects, and other effects not mentioned above will be clearly understood by those skilled in the art from the following description.

DESCRIPTION OF DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIGS. 7 and 8 are diagrams illustrating configuration of the header field of the radio frame of FIG. 6;

FIG. 9 is a diagram showing a PPDU structure applicable to the present invention;

BEST MODE

Mode for Invention

Reference will now be made in detail to the exemplary embodiments of the present invention, examples of which are illustrated in the accompanying drawings. The detailed description, which will be given below with reference to the accompanying drawings, is intended to explain exemplary embodiments of the present invention, rather than to show the only embodiments that can be implemented according to the present invention.

The following detailed description includes specific details in order to provide a thorough understanding of the present invention. However, it will be apparent to those skilled in the art that the present invention may be practiced without such specific details. In some instances, known structures and devices are omitted or are shown in block diagram form, focusing on important features of the structures and devices, so as not to obscure the concept of the present invention.

As described above, a detailed description will be given of the introduction of the concept of a downlink oriented channel, and a method and apparatus for conducting communication using a downlink oriented channel in a high-density Wireless Local Area Network (WLAN) system.

1. Wireless LAN (WLAN) System 1-1. Generals of WLAN System

Figure 1:
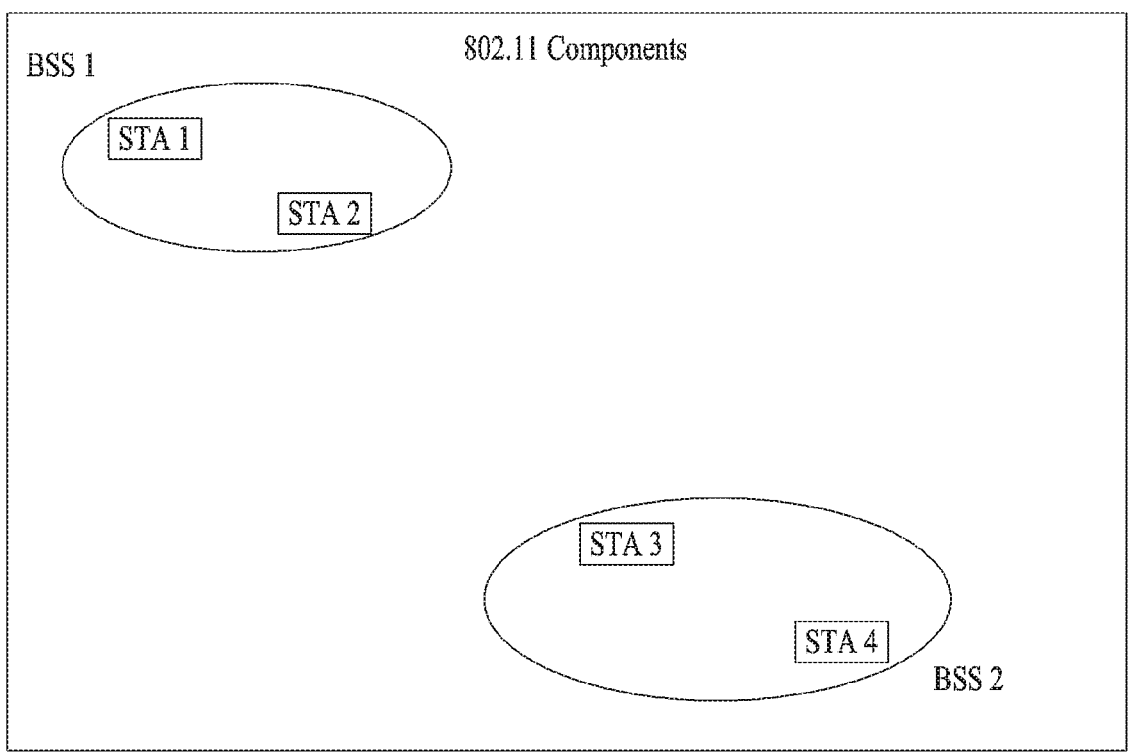
FIG. 1 is a diagram illustrating an exemplary configuration of a Wireless Local Area Network (WLAN) system.

FIG. 1 is a diagram illustrating an exemplary configuration of a WLAN system.

As illustrated in FIG. 1, the WLAN system includes at least one Basic Service Set (BSS). The BSS is a set of STAs that are able to communicate with each other by successfully performing synchronization.

An STA is a logical entity including a physical layer interface between a Medium Access Control (MAC) layer and a wireless medium. The STA may include an AP and a non-AP STA. Among STAs, a portable terminal manipulated by a user is the non-AP STA. If a terminal is simply called an STA, the STA refers to the non-AP STA. The non-AP STA may also be referred to as a terminal, a Wireless Transmit/Receive Unit (WTRU), a User Equipment (UE), a Mobile Station (MS), a mobile terminal, or a mobile subscriber unit.

The AP is an entity that provides access to a Distribution System (DS) to an associated STA through a wireless medium. The AP may also be referred to as a centralized controller, a Base Station (BS), a Node-B, a Base Transceiver System (BTS), or a site controller.

The BSS may be divided into an infrastructure BSS and an Independent BSS (IBSS).

The BSS illustrated in FIG. 1 is the IBSS. The IBSS refers to a BSS that does not include an AP. Since the IBSS does not include the AP, the IBSS is not allowed to access to the DS and thus forms a self-contained network.

Figure 2:
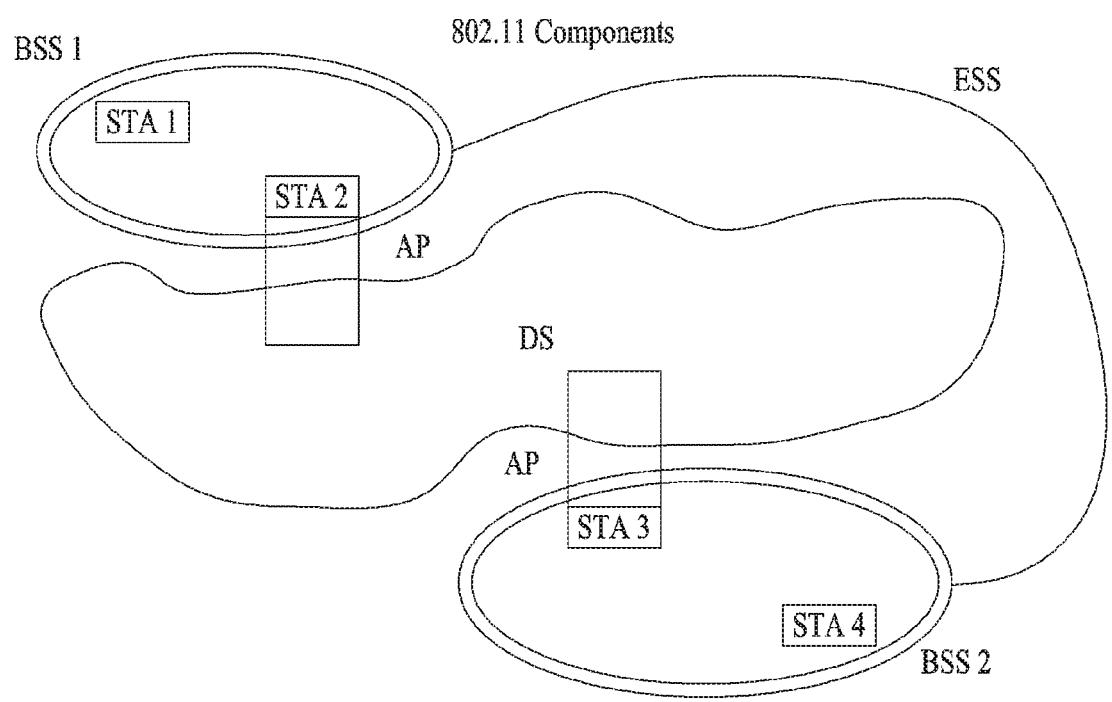
FIG. 2 is a diagram illustrating another exemplary configuration of a WLAN system.

FIG. 2 is a diagram illustrating another exemplary configuration of a WLAN system.

BSSs illustrated in FIG. 2 are infrastructure BSSs. Each infrastructure BSS includes one or more STAs and one or more APs. In the infrastructure BSS, communication between non-AP STAs is basically conducted via an AP.

However, if a direct link is established between the non-AP STAs, direct communication between the non-AP STAs may be performed.

As illustrated in FIG. 2, the multiple infrastructure BSSs may be interconnected via a DS. The BSSs interconnected via the DS are called an Extended Service Set (ESS). STAs included in the ESS may communicate with each other and a non-AP STA within the same ESS may move from one BSS to another BSS while seamlessly performing communication.

The DS is a mechanism that connects a plurality of APs to one another. The DS is not necessarily a network. As long as it provides a distribution service, the DS is not limited to any specific form. For example, the DS may be a wireless network such as a mesh network or may be a physical structure that connects APs to one another.

Based on the above, a method of channel bonding in the WLAN system will be described.

1-2. Channel Bonding in WLAN System

Figure 3:
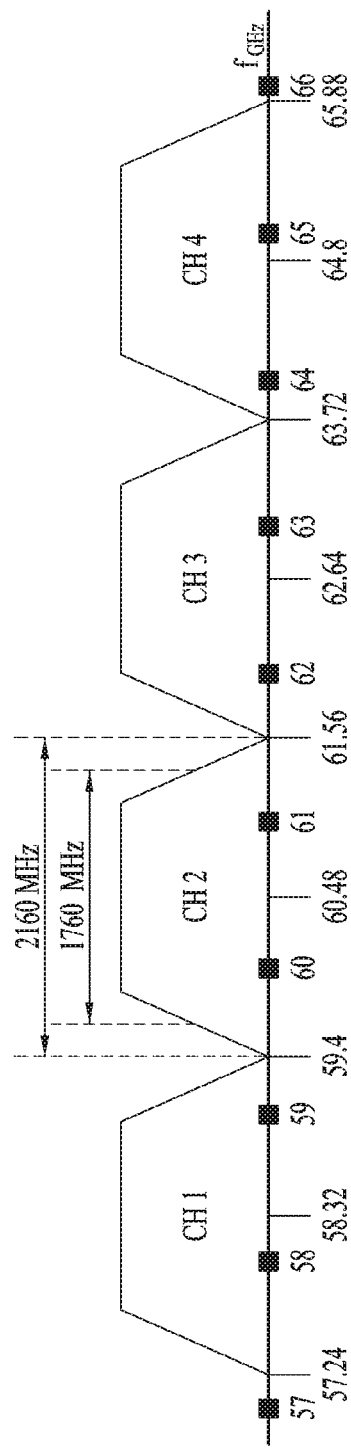
FIG. 3 is a diagram illustrating a channel in a 60 GHz band for explaining a channel bonding operation according to an embodiment of the present invention.

FIG. 3 is a diagram illustrating a channel in a 60 GHz band for explaining a channel bonding operation according to an embodiment of the present invention.

As shown in FIG. 3, four channels may be configured in the 60 GHz band, and the typical channel bandwidth may be 2.16 GHz. The ISM band (57 GHz to 66 GHz) available at 60 GHz may be specified differently for different countries. In general, channel 2 of the channels shown in FIG. 3 is available in all regions and may be used as a default channel. Most of the regions, except Australia, may use channels 2 and 3, which may be utilized for channel bonding. However, the channels used for channel bonding may vary, and the present invention is not limited to a specific channel.

Figure 4:
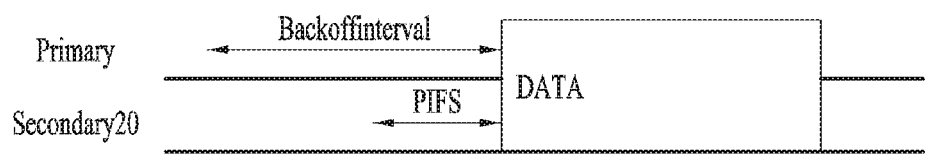
FIG. 4 illustrates a basic method of performing channel bonding in a WLAN system.

FIG. 4 illustrates a basic method of performing channel bonding in a WLAN system.

The example of FIG. 4 illustrates the operation of 40 MHz channel bonding performed by combining two 20 MHz channels in the IEEE 802.11n system. For IEEE 802.11ac, 40/80/160 MHz channel bonding may be performed.

The two channels exemplarily shown in FIG. 4 include a primary channel and a secondary channel, and the STA may review the channel status of the primary channel of the two channels in the CSMA/CA manner. If the secondary channel is idle for a predetermined time (e.g., PIFS) while the primary channel is idle during a certain backoff interval and the backoff count becomes 0, the STA may transmit data by bonding the primary channel and the secondary channel.

In the case where channel bonding is performed based on contention as shown in FIG. 4, channel bonding is allowed only when the secondary channel remains idle for a predetermined time at the time when the backoff count for the primary channel expires, and therefore the application of channel bonding is very limited, and it is difficult to flexibly cope with the media situation.

Accordingly, in one aspect of the present invention, an AP may transmit scheduling information to STAs to perform access based on scheduling. Meanwhile, in another aspect of the present invention, channel access may be performed based on the above-described scheduling or on contention independently of the above-described scheduling. In yet another aspect of the present invention, communication may be performed based on beamforming using a spatial sharing technique.

1-3. Beacon Interval Configuration

Figure 5:
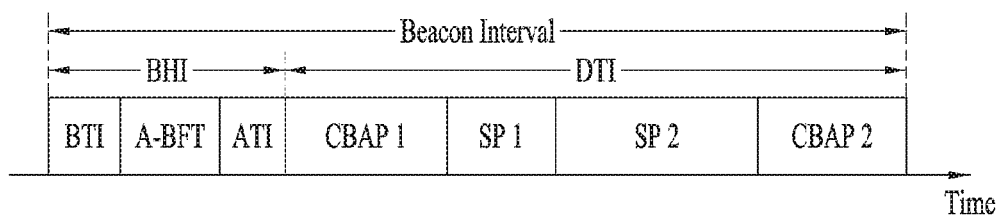
FIG. 5 is a diagram illustrating configuration of a beacon interval.

FIG. 5 is a diagram illustrating configuration of a beacon interval.

In 11ad-based DMG BSS systems, the media time may be divided into beacon intervals. The sub-intervals within a beacon interval may be referred to as access periods. Different access intervals within one beacon interval may have different access rules. The information on the access intervals may be transmitted to a non-AP STA or a non-PCP by the AP or Personal Basic Service Set Control Point (PCP).

As shown in FIG. 5, one beacon interval may include one beacon header interval (BHI) and one data transfer interval (DTI). The BHI may include a beacon transmission interval (BTI), an association beamforming training (A-BFT) interval, and an announcement transmission interval (ATI) as shown in FIG. 4.

The BTI refers to an interval during which one or more DMG beacon frames may be transmitted. The A-BFT interval refers to an interval during which beamforming training is performed by an STA that has transmitted the DMG beacon frame during the preceding BTI. The ATI refers to a request-response-based management access interval between a PCP/AP and a non-PCP/non-AP STA.

Meanwhile, the data transfer interval (DTI) is an interval during which frame exchange is performed between STAs, and may be allocated one or more Contention Based Access Periods (CBAPs) and one or more service periods (SPs) as shown in FIG. 5. Although FIG. 5 illustrates an example of allocation of two CBAPs and two SPs, this is illustrative and not restrictive.

Hereinafter, the physical layer configuration in a WLAN system to which the present invention is applied will be described in detail.

1-4. Physical Layer Configuration

It is assumed that the following three different modulation modes may be provided in the WLAN system according to an embodiment of the present invention.

TABLE 1

| PHY | MCS | Note |
|---|---|---|
| Control PHY | 0 | |
| Single carrier PHY (SC PHY) | 1 . . . 12 25 . . . 31 | (low power SC PHY) |
| OFDM PHY | 13 . . . 24 | |

Such modulation modes may be used to satisfy different requirements (e.g., high throughput or stability). Depending on the system, only some of these modes may be supported.

Figure 6:
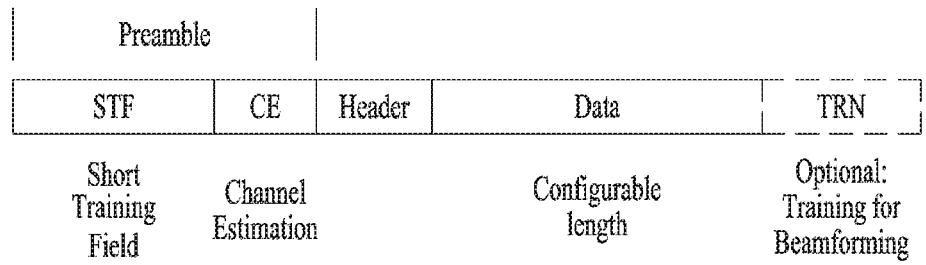
FIG. 6 is a diagram illustrating a physical configuration of an existing radio frame.

FIG. 6 is a diagram illustrating a physical configuration of an existing radio frame.

It is assumed that all the Directional Multi-Gigabit (DMG) physical layers include fields as shown in FIG. 6 in common. However, depending on the respective modes, physical layers may have a different method of defining individual fields and use a different modulation/coding scheme.

As shown in FIG. 6, the preamble of a radio frame may include a Short Training Field (STF) and Channel Estimation (CE). In addition, the radio frame may include a header and a data field as payload, and selectively include a TRN (Training) field for beamforming.

Figure 7:
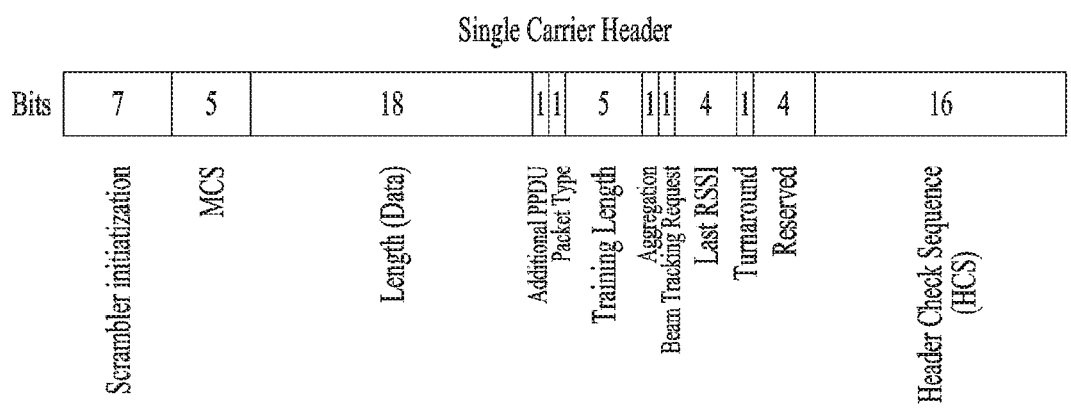

FIGS. 7 and 8 are diagrams illustrating configuration of the header field of the radio frame of FIG. 6.

Specifically, FIG. 7 illustrates a case where an Single Carrier (SC) mode is used. In the SC mode, the header may include information indicating an initial value of scrambling, a Modulation and Coding Scheme (MCS), information indicating the length of data, information indicating the presence or absence of an additional Physical Protocol Data Unit (PPDU), a packet type, a training length, an aggregation status, a beam tracking request status, a last Received Signal Strength Indicator (RSSI), a truncation status, and a Header Check Sequence (HCS). In addition, as shown in FIG. 7, the header has 4 reserved bits. The reserved bits may be utilized in the following description.

FIG. 8 specifically illustrates configuration of a header in a case where the OFDM mode is applied. The OFDM header may include information indicating an initial value of scrambling, an MCS, information indicating the length of data, information indicating the presence or absence of additional PPDU, a packet type, a training length, an aggregation status, a beam tracking request status, a last RSSI, a truncation status, and an HCS. In addition, as shown in FIG. 8, the header has 2 reserved bits. The reserved bits may be utilized in the following description as in the case of FIG. 7.

As described above, the IEEE 802.11ay system is considering introduction of channel bonding and MIMO technology in the legacy 11ad system for the first time. In order to implement channel bonding and MIMO in 11ay, a new PPDU structure is needed. In other words, the existing 11ad PPDU structure has limitations in supporting legacy UEs and implementing channel bonding and MIMO.

For this, a legacy preamble for supporting a legacy UE and a new field for a 11ay UE following a legacy header field may be defined, and channel bonding and MIMO may be supported through the newly defined field.

FIG. 9 is a diagram showing a PPDU structure according to a preferred embodiment of the present invention. In FIG. 9, the abscissa may correspond to the time domain, and the ordinate may correspond to the frequency domain.

When two or more channels are bonded, a frequency band (for example, a 400 MHz band) may exist between frequency bands (e.g., 1.83 GHz) used in the respective channels. In the mixed mode, a legacy preamble (legacy STF, legacy CE) is transmitted in duplicate through each channel. In an embodiment of the present invention, transmitting the new STF and CE field (gap filling) preamble through the 400 MHz band between the channels along with transmission of the legacy preamble may be considered.

In this case, as shown in FIG. 9, in the PPDU structure according to the present invention, ay STF, ay CE, ay header B, and payload are transmitted over broadband after a legacy preamble, a legacy header and an ay header A. Therefore, the ay header, ay Payload field, and the like to be transmitted after the header field may be transmitted through channels used for bonding. In order to distinguish the ay header from the legacy header, the ay header may be referred to as an enhanced directional multi-gigabit (EDMG) header, or "ay header" and "EDMG header" may be interchangeably used.

For example, a total of six channels (2.16 GHz) may be present in flay, and up to four channels may be bonded and transmitted to a single STA. Thus, the ay header and the ay payload may be transmitted over bandwidths of 2.16 GHz, 4.32 GHz, 6.48 GHz, and 8.64 GHz.

Alternatively, the PPDU format used when the legacy preamble is repeatedly transmitted without performing the gap-filling described above may also be considered.

In this case, the gap-filling is not performed, and thus the ay STF, ay CE, and ay header B are transmitted in a wideband after the legacy preamble, legacy header, and ay header A, without the GF-STF and GF-CE field indicated by the dotted line in FIG. 9.

2. Beamforming Method Applicable to the Present Invention

In the following, a beamforming method or a beamforming protocol applicable to the present invention is explained in detail.

Figure 10:
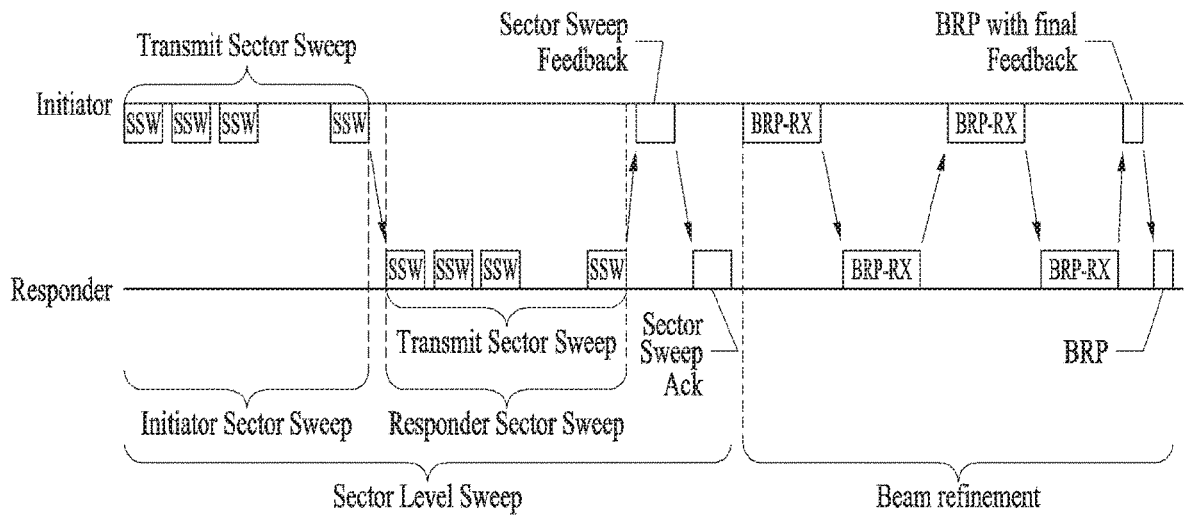
FIG. 10 illustrates an example of a beamforming training procedure applicable to the present invention.

Beamforming (BF) is a mechanism for performing a link budget necessary for a pair of STAs to perform continuous communication. BF training corresponds to a bidirectional sequence of a BF sequence using sector sweep and provides signaling necessary for an STA to determine an antenna system setting appropriate for transmission and reception. If the BF training is successfully performed, it can be regarded as BF has been established. In this case, the BF frame includes an SSW (Sector SWeep) frame, an (EDMB) beacon frame, an SSW-Feedback frame, an SSW-ACK frame, and a BRP (Beam Refinement Protocol) frame. FIG. 10 illustrates an example of a beamforming training procedure applicable to the present invention.

In FIG. 10, an STA initiating BF training by transmitting a BF frame is referred to as an initiator and an STA receiving the BF frame and participating in the BF training initiated by the initiator is referred to as a responder.

When BF training is initiated within A-BFT (Association Beamforming Training) allocation, an AP or a PCP/AP corresponds to an initiator and a non-AP or a non-PCP/AP STA corresponds to a responder. When BF training is initiated within SP allocation, a source (EDMG) STA of the SP corresponds to an initiator and a destination STA of the SP corresponds to a responder. When BF training is initiated within TXOP (Transmission Opportunity) allocation, a TXOP holder corresponds to an initiator and a TXOP responder corresponds to a responder.

A link from the initiator to the responder is referred to as an initiator link and a link form the responder to the initiator is referred to as a responder link.

BF training starts together with SLS (Sector Level Sweep) from an initiator. If there is a request from an initiator or a responder, BRP (Beam Refinement Protocol) can be continued after the SLS.

An object of an SLS phase is to enable communication to be performed between two STAs in a control PHY rate or upper MCS. In particular, the SLS phase provides transmission of BF training only.

An object of a BRP phase is to enable reception training to be performed and enable iterative refinement of an AWV (Antenna Weight Vector) of all transmitters and receivers to be performed in all STAs. If one of STAs participating in beam training determines to use a single transmission antenna pattern only, reception training can be performed as a part of the SLS phase.

The SLS phase is explained in more detail. The SLS phase can include 4 elements including ISS (Initiator Sector Sweep) for training an initiator link, an RSS (Responder Sector Sweep) for training a responder link, SSW feedback, and SSW ACK.

An initiator initiates the SLS phase by transmitting a frame(s) of ISS.

A responder does not start to transmit a frame(s) of RSS until the ISS is successfully completed. However, there is an exceptional case when the ISS occurs within BTI.

The initiator does not start SSW feedback until the RSS phase is successfully completed. However, there is an exception case when the RSS occurs within A-BFT. The responder does not start SSW ACK of the initiator within the A-BFT.

The responder starts the SSW ACK of the initiator immediately after the SSW feedback of the initiator is successfully completed.

A BF frame transmitted by the initiator during the SLS phase can include a (EDMG) beacon frame, an SSW frame, and an SSW feedback frame. A BF frame transmitted by the responder during the SLS phase can include an SSW frame and an SSW-ACK frame.

If each of the initiator and the responder executes TXSS (Transmit Sector Sweep) during the SLS phase, each of the initiator and the responder possesses a transmission sector of its own at the end of the SLS phase. If the ISS or the RSS employs receive sector sweep, each of the responder and the initiator can possess a reception sector of its own.

An STA does not change transmit power during sector sweep.

Figure 11:
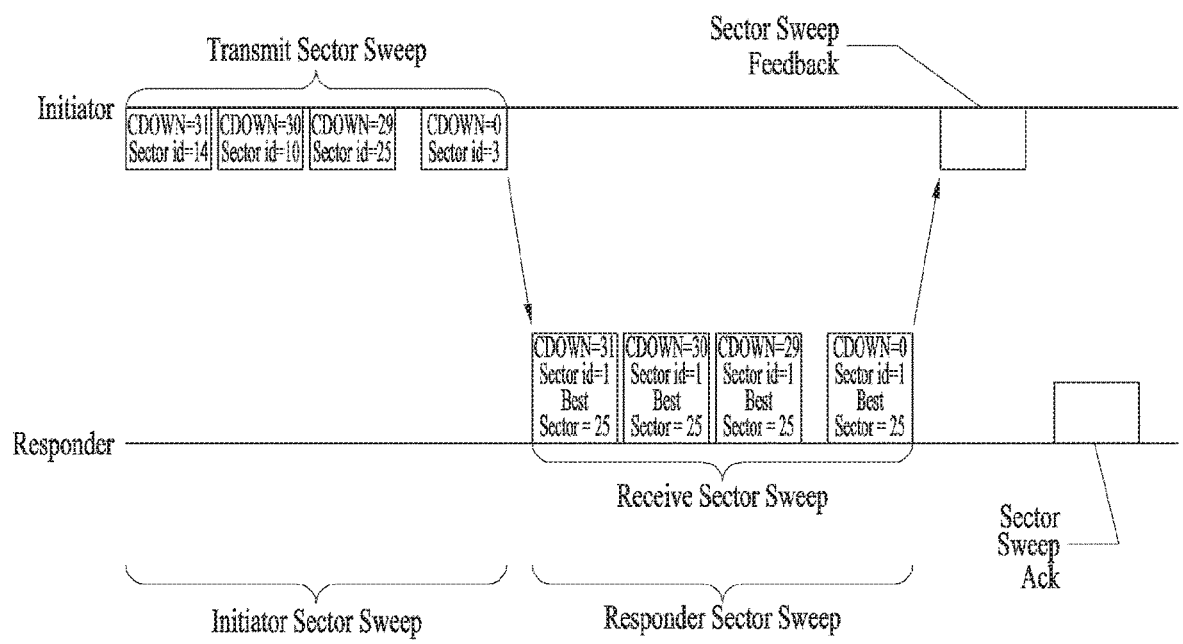
FIGS. 11 and 12 are diagrams illustrating examples of an SLS phase.
Figure 12:
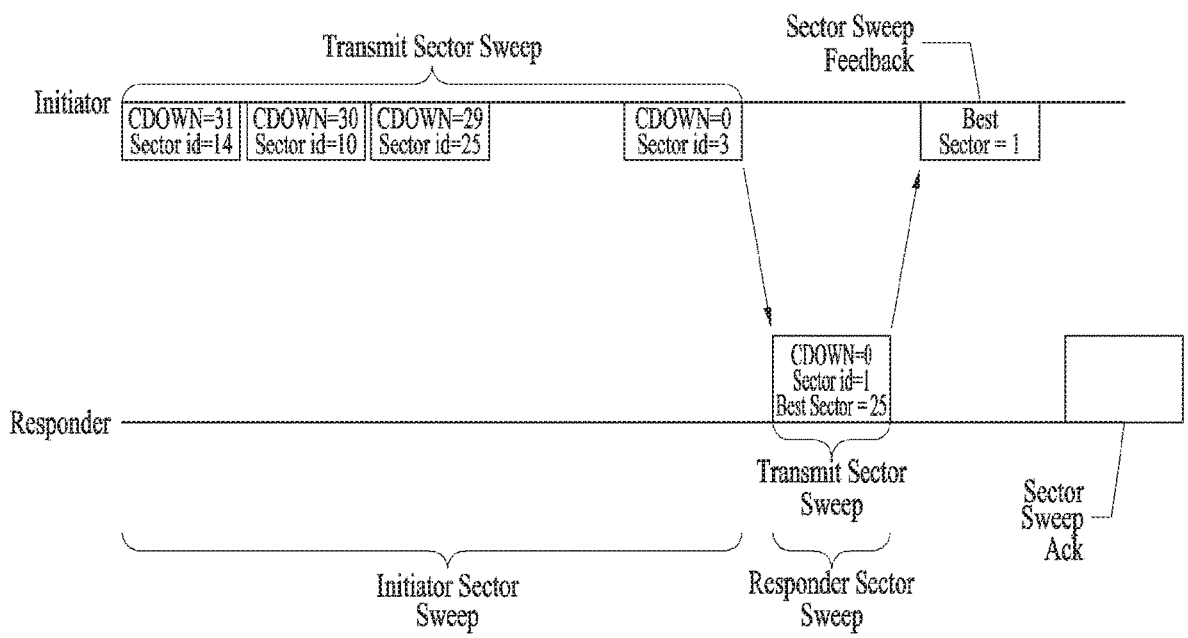

FIGS. 11 and 12 are diagrams illustrating examples of an SLS phase.

Referring to FIG. 11, an initiator has many sectors and a responder has a transmission sector and a reception sector used in RSS. Hence, the responder transmits all responder SSS frames via the same transmission sector and the initiator switches a reception antenna at the same time.

Referring to FIG. 12, an initiator has many sectors and a responder has a transmission sector. In this case, reception training for the initiator can be performed in a BRP phase.

In particular, the SLS can be summarized as follows.

The SLS corresponds to a protocol that performs link detection in 802.11ad system. The SLS corresponds to a beam training scheme that enables network nodes to continuously transmit and receive a frame including the same information while changing a direction of a beam only and select a beam direction having an indicator (e.g., SNR (Signal to Ratio), RSSI (Received Signal Strength Indicator)) indicating the best performance of a reception channel link from among the successfully received frames.

Subsequently, the BRP can be summarized as follows.

The BRP corresponds to a protocol that minutely controls a beam direction capable of maximizing a data transfer rate of the beam direction determined by the SLS or a different medium. The BRP performs beam training using a BRP frame including beam training information and information configured to report a training result. The BRP frame is defined for a BRP protocol. For example, the BRP transmits and receives a BRP frame using a beam determined by previous beam training and practically performs beam training using a beam training sequence included in an end part of a successfully transmitted and received BRP frame. There is a difference between the SLS and the BRP. In particular, the SLS uses a frame itself for beam training. On the other hand, the BRP uses a beam training sequence only.

It may apply BT (Beam Tracking) as an additional BF training method.

In this case, the BT (Beam Tracking) corresponds to a protocol capable of performing data transmission and beam training at the same time. The BT corresponds to a beam training scheme that performs data transmission and beam training at the same time by including beam training information in a PHY header of a data frame and including a sequence for beam training in an end part of the data frame.

3. Signal Transmission/Reception Method Proposed by the Present Invention

In 11ay system to which the present invention is applicable, an STA can transmit and receive a signal using one or more channels. However, since an STA performs decoding on a single channel (e.g., a primary channel) only in Wi-Fi system, in order for an STA receiving a signal to properly receive the signal, it is necessary for the STA to have information indicating that the signal is transmitted using not only a primary channel but also a secondary channel. More specifically, in order for an STA receiving a signal to properly receive the signal, it is necessary for the STA to have channel configuration information indicating the number of channels used for transmitting the signal among available channels.

The present invention proposes a transmission method optimized to 11ay system. In particular, the present invention proposes a method of transmitting the channel configuration information using a Header-A field. In addition, the present invention also proposes a method of transmitting channel configuration information of a PPDU to be transmitted later using a MAC frame (a grant frame, a trigger frame, or a scheduling frame).

The 11ay system to which the present invention is applicable supports maximum 8 channels and may be able to support channel bonding of maximum 4 channels to transmit a signal to a single STA. In the present invention, for clarity, assume that channel bonding of maximum 4 channels is supported in a system and a channel overlap case is excluded at the time of performing the channel bonding. Specifically, in the present invention, when the prescribed number (e.g., 2 channels) of channels are bonded, assume that a specific channel is included in single channel bonding only and is not included in a plurality of channel bonding (e.g., 2 channel bonding). In particular, in a system supporting maximum 4 channels, a channel type capable of being used at the time of performing channel bonding or single channel transmission can be represented as FIG. 13.

Figure 13:
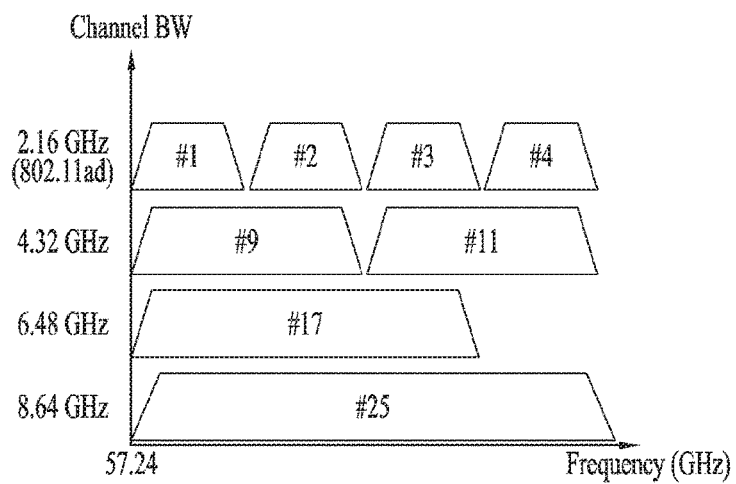
FIG. 13 is a diagram illustrating examples of channel bonding applicable to the present invention.

FIG. 13 is a diagram illustrating examples of channel bonding applicable to the present invention.

As shown in FIG. 13, when s single channel transmission is performed, an STA can transmit a signal using a channel type selected from among #1, #2, #3, and #4. In particular, the number of cases of channel types usable for performing single channel transmission transmitted by an STA corresponds to 4 in total.

When an STA performs transmission by bonding two channels, the STA can transmit a signal using a channel type defined as #9 by boding channels #1 and #2 or a channel type defined as #11 by bonding channels #3 and #4. In particular, the number of cases of channel types usable for bonding two channels corresponds to 2 in total. In this case, as mentioned in the foregoing description, since a channel overlap case is excluded, a case that an STA transmits a signal by boding a channel #2 and a channel #3 is excluded. And, since an available channel width varies depending on a country and a region, the abovementioned type of 2-channel bonding can be differentiated. For example, when single channel transmission is performed, if a channel #1 is unavailable in a certain region, an STA can transmit a signal using one selected from the group consisting of a channel #2, a channel #3, and a channel #4. When 2-channel bonding is performed, the STA can transmit a signal by bonding the channels #2 and #3 or bonding the channels #3 and #4. In this case, if channels are overlapped, since an overlay case is not allowed, it may apply one of the two cases only.

When an STA performs transmission by bonding three channels, the STA can transmit a signal using a channel type defined as #17 by boding channels #1, #2, and #3. When an STA performs transmission by bonding four channels, the STA can transmit a signal using a channel type defined as #25 by boding channels #1, #2, #3, and #4. In this case, as mentioned in the foregoing description, since an available channel width varies depending on a country and a region, channels different from the abovementioned channels are bonded and can be mapped with a different index. Or, in case of using channel aggregation using two RF (Radio Frequency) chains, it can be represented by a form of 2.16 GHz+2.16 GHz. In this case, the number of cases of the form corresponds to $_4C_2$ (i.e., 6).

Consequently, when an STA transmits a signal, the number of cases of channel bonding usable for transmitting the signal corresponds to 14 types in total.

Single channel→4 types
    2 channel bonding→2 types
    3 channel bonding→1 type
    4 channel bonding→1 type
    Channel aggregation→6 types Meanwhile, in case of performing transmission using a single channel, the channel operates as a primary channel. On the other hand, in case of transmitting a signal by bonding two or more channels, it is necessary for an STA receiving the signal to obtain information on a primary channel among the bonded channels. This is because, when the STA receiving the signal performs initial access, the STA performs feedback on I-TXSS during SLS by transmitting an SSW frame through the primary channel. In particular, if an STA receiving a signal fails to obtain information on a primary channel, the STA is unable to know a channel on which an SSW frame is to be transmitted. As a result, the STA is unable to perform initial access.

The present invention proposes two methods described in the following as a method of obtaining information on a primary channel.

(1) A PCP/AP or an STA transmits a signal using a primary channel only in a BTI section.

Although a PCP/AP or an STA has capability capable of bonding channels, when the PCP/AP or the STA transmits a beacon frame or transmits a signal in a BTI section, the PCP/AP or the STA transmits the signal using a primary channel only. In particular, the PCP/AP or the STA does not transmit the same duplicated signal on a plurality of channels. In particular, if an STA receives a beacon frame, the STA is able to recognize that a channel on which the signal is transmitted corresponds to a primary channel.

(2) A PCP/AP or an STA indicates both information on bonded channels and information on a primary channel.

When a PCP/AP or an STA transmits a beacon frame on a plurality of channels by duplicating the beacon frame, an STA receiving the beacon frame is unable to know a primary channel among a plurality of the channels. Hence, when the PCP/AP or the STA transmits information on bonded channels to the STA receiving the beacon frame, the PCP/AP or the STA can indicate information on a primary channel among the bonded channels together with the information on the bonded channels.

Specifically, if an STA operates according to the aforementioned method (2), the STA may have 27 channel combinations in total.

Single channel→4 types*1=4 types
    2 channel bonding→2 types*2=4 types
    3 channel bonding→1 type 8 3=3 types
    4 channel bonding→1 type*4=4 types
    Channel aggregation→6 types*2=12 types In order for the PCP/AP or the STA to indicate the channel combinations, it is necessary to have a field of a size of minimum 5 bits.

In this case, corresponding information can be transmitted via EDMG Header-A or EDMG Header-B. In this case, an STA receiving a signal decodes EDMG Header-A field or EDMG Header-B field while performing decoding on a channel to obtain channel combination information. If the STA obtains the channel combination information, the STA recognizes channel bonding or channel aggregation and may be then able to change a reception procedure. Or, if corresponding information is transmitted using a MAC frame (e.g., a grant frame, a trigger frame, or a scheduling frame), an STA receiving a signal can receive a preamble, a legacy part, EDMG Header-A field, and EDMG Header-B field by changing a reception procedure using channel bonding or channel aggregation.

In addition, the present invention proposes a method of reducing the number of bits necessary for indicating the channel combination. In the following, for clarity, assume a case that channel combination information is transmitted using EDMG Header-A or EDMG Header-B. In other word, assume that an STA receiving a signal receives the signal while operating with a reception procedure of performing decoding on a single channel only. In this case, the configuration above can be extensively applied to a case that the channel combination information is transmitted via a MAC frame.

Among the aforementioned channel combinations, since the single channel transmission uses a single channel only to transmit a signal, it is not necessary to transmit information on a primary channel among channels #1 to #4. In particular, if an STA succeeds in performing decoding on a random channel or a result of single detection (CCA-SD) performed by the STA exceeds a CCA threshold according to a channel bandwidth, the STA is able to recognize that the channel corresponds to a subset of a configuration of a channel on which a PPDU is transmitted. If the STA becomes aware that the signal transmission corresponds to single channel transmission, the STA is able to know that the channel corresponds to a primary channel. In particular, in case of the single channel transmission, the number of cases of information to be indicated is reduced to 1 type.

In case of bonding two channels, an STA receiving a signal can determine whether a channel type of which the two channels are bonded corresponds to a channel #9 or a channel #11 according to whether or not detection or decoding is successfully performed. When two channels are bonded, since channels adjacent to each other are bonded only, it may indicate a channel bonded with a channel having a frequency lower than a frequency of a detected channel or a channel bonded with a channel having a frequency higher than a frequency of a detected channel. In particular, in case of bonding two channels, the number of cases of information to be indicated is reduced to 2 types.

Figure 14:
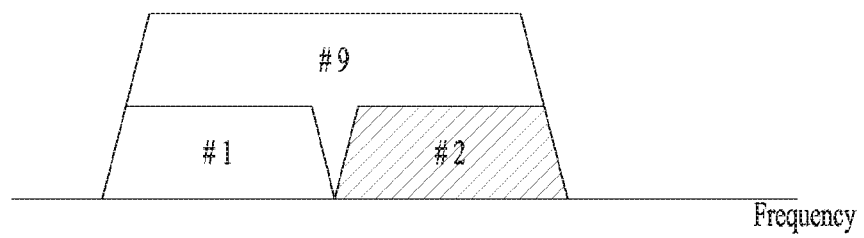
FIG. 14 is a diagram illustrating an example of boding two channels when a channel #2 is a primary channel.

FIG. 14 is a diagram illustrating an example of boding two channels when a channel #2 is a primary channel.

As shown in FIG. 14, when a channel #9 is defined by bonding a channel #1 and a channel #2 according to 2-channel bonding, a PCP/AP or an STA can transmit a signal by bonding the channel #1 and the channel #2. In this case, the channel #2 may correspond to a primary channel.

In this case, if an STA receiving a signal fails to obtain information on channel bonding, performs decoding on EDMG Header-A or EDMG Header-B on a random channel among the channel #1 and the channel #2, and succeeds in performing the decoding, the STA can recognize 2-channel bonding defined by a channel #9. In this case, if the STA obtains information indicating a primary channel corresponding to a channel (low channel) having a low frequency or a primary channel corresponding to a channel (upper channel) having a high frequency among channels constructing the channel #9, the STA can obtain all channel configuration information.

In case of bonding three channels or four channels, if an STA receiving a signal succeeds in performing decoding on EDMG Header-A or EDMG Header-B on a random channel constructing the channel bonding, the STA can recognize relevant information and can obtain channel configuration information based on the relevant information.

In addition, in case of channel aggregation, a PCP/AP or an STA can perform aggregation not only on channels adjacent to each other but also on channels not adjacent to each other. If channels adjacent to each other are aggregated, since it becomes a channel configuration identical to the 2-channel bonding, separate signaling is not necessary. In particular, a channel configuration of channel aggregation includes a form of aggregating a channel #1 and a channel #3 (two types of channel combination are available according to a position of a primary channel), a form of aggregating a channel #2 and a channel #4 (two types of channel combination are available according to a position of a primary channel), a form of aggregating a channel #1 and a channel #4 (two types of channel combination are available according to a position of a primary channel), and a form of aggregating a channel #2 and a channel #3 (two types of channel combination are available according to a position of a primary channel).

In order to indicate the channel configuration information, it may be able to apply a method similar to the method used for the aforementioned 2-channel bonding. In particular, an STA receiving a signal performs decoding on EDMG Header-A or EDMG-Header-B received via a random channel. Subsequently, the STA recognizes channel aggregation transmission via the decoding and uses a position of a channel on which the decoding is performed to select a part of channel aggregation combinations of which the channel is used as a subset. Subsequently, configuration information on a primary channel can indicate whether the primary channel corresponds to a channel having a lower frequency or a channel having a higher frequency compared to a channel detected by the 2-channel bonding.

The aforementioned contents can be summarized as follows. Channel combinations in which a signal is transmittable by a PCP/AP or an STA can be represented by the number of cases described in the following.

1. Single channel
2. 2 channel bonding (#9 or #11) and lower channel is primary channel
3. 2 channel bonding (#9 or #11) and upper channel is primary channel
4. Channel aggregation ((#1+#3) or (#2+#4)) and lower channel is primary channel
5. Channel aggregation ((#1+#3) or (#2+#4)) and upper channel is primary channel
6. Channel aggregation (#1+#4) and lower channel is primary channel
7. Channel aggregation (#1+#4) and upper channel is primary channel
8. Channel aggregation (#2+#3) and lower channel is primary channel
9. Channel aggregation (#2+#3) and upper channel is primary channel
10. 3 channel bonding (#17) and lower channel is primary channel
11. 3 channel bonding (#17) and middle channel is primary channel
12. 3 channel bonding (#17) and upper channel is primary channel
13. 4 channel bonding (#25) and 1st channel is primary channel
14. 4 channel bonding (#25) and 2nd channel is primary channel
15. 4 channel bonding (#25) and 3rd channel is primary channel
16. 4 channel bonding (#25) and 4th channel is primary channel In particular, according to the proposed method, a PCP/AP or an STA can transmit a signal using one selected from among 16 channel configuration combinations. The number of bits indicating the channel configuration combinations can be represented by a size of 4 bits in total.

And, if a case of 6 and a case of 8 are combined by one and a case of 7 and a case of 9 are combined by one, it may be able to indicate one selected from among 14 channel configuration combinations.

In addition, information on the channel configuration combinations can be transmitted via a MAC frame.

Figure 15:
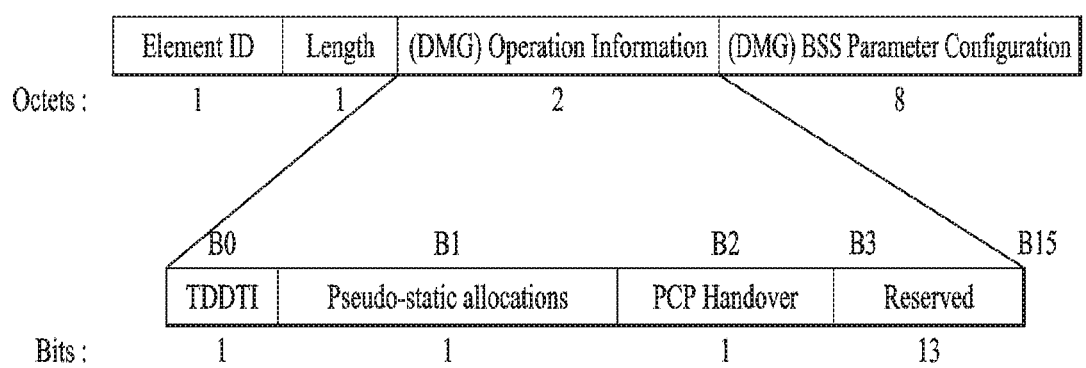
FIG. 15 is a diagram illustrating an example of an operation element and an operation information field of a MAC frame applicable to the present invention.

FIG. 15 is a diagram illustrating an example of an operation element and an operation information field of a MAC frame applicable to the present invention.

In case of transmitting the information on the channel configuration combinations via the MAC frame, as shown in FIG. 15, a PCP/AP or an STA can transmit channel configuration information to 11ay UEs while supporting legacy UEs using reserved bits of an operation element. A specific configuration of the operation element is shown in FIG. 15. As shown in FIG. 15, it may be able to indicate the channel configuration information using reserved bits having a size of 13 bits included in the operation element.

In this case, as a structure of an operation element, it may utilize a DMB operation element defined in 11ad system or define a new EDMG operation element for 11ay system.

In addition, a PCP/AP or an STA can transmit channel configuration information via a capability element included in a MAC frame. In this case, as a structure of an operation element, it may utilize a DMB capability element defined in 11ad system or define a new EDMG capability element for 11ay system.

In the following, a method of transmitting and receiving a signal proposed by the present invention is explained.

An STA transmitting a signal (hereinafter, first STA) transmits a beacon frame or information indicating a primary channel to an STA receiving the signal (hereinafter, second STA) via the primary channel configured via a system or an operation channel configured to operate together with the primary channel. More specifically, the first STA can transmit the beacon frame to the second STA via a primary channel only among a plurality of channels to inform the second STA of the primary channel. Hence, the second STA can recognize that a channel on which the beacon frame is received corresponds to the primary channel. Or, the second STA can recognize the primary channel by performing decoding on the received information. In this case, the beacon frame can be transmitted during a BRI section.

Subsequently, the first STA transmits information indicating a plurality of channels including the primary channel on which a signal is transmitted to the second STA and transmits a signal to the second STA via a plurality of the channels.

As mentioned in the foregoing description, a plurality of the channels can include the maximum 4 channels among the total 8 channels.

For example, as shown in FIG. 18, a plurality of the channels may apply channels adjacent to each other.

And, the present invention considers not only a case of transmitting a signal by applying channel bonding but also a case of transmitting a signal by applying channel aggregation. In particular, if a plurality of the channels correspond to two channels, the two channels can include two channels adjacent to each other or two channel not adjacent to each other.

In this case, when the first STA transmits information indicating the primary channel, the information indicating the primary channel and information indicating the information indicating the primary channel and a plurality of channels on which the signal is transmitted can be transmitted via an EDMG Header-A field or an EDMG operation element field.

In this case, the information indicating the primary channel and the information indicating the information indicating the primary channel and a plurality of the channels on which the signal is transmitted can be simultaneously indicated via one of the indication fields (e.g., the EDMG Header-A field or the EDMG operation element field).

In this case, if the information indicating the primary channel and the information indicating a plurality of the channels on which the signal is transmitted are transmitted via the EDMG Header-A field, the second STA receives the information indicating the primary channel and the information indicating the information indicating the primary channel and a plurality of the channels on which the signal is transmitted using a channel selected from among a plurality of the channels. The second STA can receive a signal transmitted from the first STA using all of a plurality of the channels.

When the first STA transmits a beacon frame via the primary channel, the beacon frame can be transmitted during a BTI (Beacon Transmission Interval).

In this case, preferably, the beacon frame may not be transmitted on a channel rather than the primary channel.

4. Device Configuration

Figure 16:
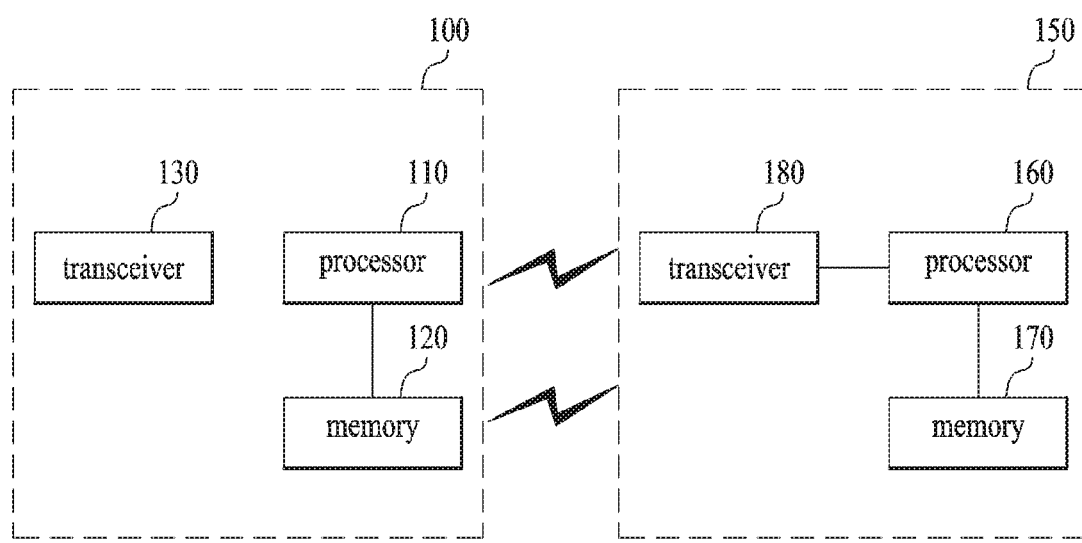
FIG. 16 is a diagram for explaining devices for implementing the aforementioned method.

FIG. 16 is a diagram illustrating devices for implementing the above-described method.

In FIG. 16, a wireless device 100 may correspond to a station configured to transmit a signal by bonding or aggregating a plurality of channels in the foregoing description and a wireless device 150 may correspond to a station configured to receive a signal transmitted by bonding or aggregating a plurality of channels in the foregoing description. In this case, each of the stations may correspond to an 11ay UE or a PCP/AC. In the following description, for clarity, a station transmitting a signal is referred to as a transmitting device 100 and a station receiving a signal is referred to as a receiving device 150.

The transmitting device 100 may include a processor 110, a memory 120 and a transceiver 130. The receiving device 150 may include a processor 160, a memory 170, and a transceiver 180. The transceivers 130 and 180 may transmit/receive wireless signals and may be implemented in a physical layer such as IEEE 802.11/3GPP. The processors 110 and 160 are implemented in the physical layer and/or MAC layer and are connected to the transceivers 130 and 180. The processors 110 and 160 may perform the UL MU scheduling procedure described above.

The processors 110 and 160 and/or the transceivers 130 and 180 may include application specific integrated circuits (ASICs), other chipsets, logic circuits, and/or data processors. The memories 120 and 170 may include a read-only memory (ROM), a random access memory (RAM), a flash memory, a memory card, a storage medium and/or other storage units. When an embodiment is executed by software, the method described above may be executed as a module (e.g., a process, a function) that performs the functions described above. The module may be stored in the memory 120,170 and executed by the processor 110,160. The memory 120, 170 may be located inside or outside the processor 110, 160 and may be connected to the processor 110, 160 by a well-known means.

The detailed description of preferred embodiments of the invention set forth above is provided to enable those skilled in the art to implement and practice the invention. Although the present invention has been fully described by way of example with reference to the accompanying drawings, it is to be understood that various modifications and changes may be made in the invention without departing from the scope and spirit of the invention. Accordingly, the present invention is not intended to be limited to the embodiments disclosed herein but is to be accorded the widest scope consistent with the principles and novel features disclosed herein.

INDUSTRIAL APPLICABILITY

Although it is explained that the present invention is applied to IEEE 802.11 based wireless LAN system, by which the present invention may be non-limited. The present invention can be applied to various wireless systems capable of performing data transmission based on channel bonding using the same method.

What is claimed is:

1. A method performed by a first station (STA) to a second STA in a wireless local area network (WLAN) system, the method comprising:
    transmitting information indicating a plurality of channels for transmitting a signal to the second STA;
    transmitting a beacon frame on a specific channel among the plurality of the channels; and
    transmitting the signal to the second STA on the plurality of the channels, wherein based on the beacon frame being transmitted during the beacon transmission interval (BTI), the specific channel is a primary channel;
    transmitting a Sector Sweep (SSW) frame on the primary channel.

2. The method of claim 1, wherein the plurality of the channels comprises two to four channels.

3. The method of claim 2, wherein the plurality of the channels are channels adjacent to each other.

4. The method of claim 3, wherein based on the plurality of the channels being two channels, the two channels comprise two channels adjacent to each other or two channels not adjacent to each other.

5. A method performed by a first station (STA) from a second STA in a wireless local area network (WLAN) system, the method comprising:
    receiving information indicating a plurality of channels for transmitting a signal from the second STA;
    receiving a beacon frame on a specific channel among the plurality of the channels; and
    receiving the signal from the second STA on the plurality of the channels,
    wherein based on the beacon frame being transmitted during the beacon transmission interval (BTI), the specific channel is a primary channel;
    transmitting a Sector Sweep (SSW) frame on the primary channel.

6. The method of claim 5, wherein the plurality of the channels comprise two to four channels.

7. The method of claim 6, wherein the plurality of the channels are channels adjacent to each other.

8. The method of claim 7, wherein based on the plurality of the channels being two channels, the two channels contain two channels adjacent to each other or two channel not adjacent to each other.

9. A first station (STA) in a wireless local area network (WLAN) system, the first STA comprising:

a transceiver configured to transceive a signal with a second STA with one or more Radio Frequency (RF) chains; and a processor configured to process the signal transceived with the second STA in a manner of being connected with the transceiver, wherein the processor configured to:

transmit information indicating a plurality of channels for transmitting the signal to the second STA, transmit a beacon frame on a specific channel among the plurality of the channels, and transmit the signal to the second STA on the plurality of the channels, wherein based on the beacon frame being transmitted during the beacon transmission interval (BTI), the specific channel is a primary channel;

transmitting a Sector Sweep (SSW) frame on the primary channel.

10. A first station (STA) in a wireless local area network (WLAN) system, the first STA comprising:

a transceiver configured to transceive a signal with a second STA with one or more Radio Frequency (RF) chains; and a processor configured to process the signal transceived with the second STA in a manner of being connected with the transceiver, wherein the processor configured to:

receive information indicating a plurality of channels for transmitting the signal from the second STA, receiving a beacon frame on a specific channel among the plurality of the channels, and receive the signal from the second STA on the plurality of the channels, wherein based on the beacon frame being transmitted during the beacon transmission interval (BTI), the specific channel is a primary channel;

transmitting a Sector Sweep (SSW) frame on the primary channel.

* * * * *